US007584085B2

(12) United States Patent
Gold et al.

(10) Patent No.: US 7,584,085 B2
(45) Date of Patent: Sep. 1, 2009

(54) METHOD AND APPARATUS FOR SIMULATING MULTIPLE GROUND STATION RANGING FOR SPACECRAFT

(75) Inventors: Jeffrey J. Gold, Rancho Palos Verdes, CA (US); John D. Haskell, Chino Hills, CA (US)

(73) Assignee: The Boeing Company, Chicago, IL (US)

(*) Notice: Subject to any disclaimer, the term of this patent is extended or adjusted under 35 U.S.C. 154(b) by 151 days.

(21) Appl. No.: 11/431,984

(22) Filed: May 11, 2006

(65) Prior Publication Data
US 2009/0150132 A1  Jun. 11, 2009

Related U.S. Application Data

(63) Continuation of application No. 09/645,896, filed on Aug. 25, 2000, now abandoned.

(51) Int. Cl.
G06G 7/48 (2006.01)
(52) U.S. Cl. .................. 703/8; 709/203; 709/219
(58) Field of Classification Search .................. 703/8
See application file for complete search history.

(56) References Cited

U.S. PATENT DOCUMENTS

| | | | |
|---|---|---|---|
| 3,266,052 A | 8/1966 | Yarmon | |
| 3,303,583 A | 2/1967 | Petersen | |
| 3,377,471 A | 4/1968 | Althaus et al. | |
| 3,405,561 A | 10/1968 | Bogart | |
| 3,521,384 A | 7/1970 | Holland | |
| 5,483,468 A * | 1/1996 | Chen et al. | 702/186 |
| 5,485,600 A | 1/1996 | Joseph et al. | |
| 5,666,297 A | 9/1997 | Britt et al. | |
| 5,768,119 A | 6/1998 | Havekost et al. | |
| 5,808,921 A | 9/1998 | Gold et al. | |
| 6,107,958 A * | 8/2000 | Kelkar et al. | 342/169 |
| 6,182,141 B1 * | 1/2001 | Blum et al. | 709/227 |
| 6,275,936 B1 * | 8/2001 | Kyojima et al. | 713/182 |
| 6,314,344 B1 | 11/2001 | Sauer et al. | |
| 6,442,515 B1 | 8/2002 | Varma et al. | |
| 6,553,328 B1 | 4/2003 | Gold | |
| 6,684,182 B1 | 1/2004 | Gold et al. | |

(Continued)

OTHER PUBLICATIONS

Rash et al, "Internet Access to Spacecraft", 14th Annual USU Conference on Small Satellites, Aug. 21-24, 2000.*

(Continued)

Primary Examiner—Paul L Rodriguez
Assistant Examiner—Mary C Jacob
(74) Attorney, Agent, or Firm—Ostrager Chong Flaherty & Broitman P.C.

(57) ABSTRACT

A spacecraft emulation system for emulating the operation of a spacecraft and the operation of a plurality of ground stations is coupled to spacecraft status and control clients that request connections to one of the plurality of simulated ground station ranging and tracking servers. The connection requests are made to a common address with a port address that is unique to a specific ground station. Separate range servers and tracking servers are instantiated for each ground station and return data specific to the ground station. The spacecraft emulation system determines ranging and tracking data for the plurality of simulated ground stations but supplies the data on a ground station by ground station basis. The status and control system transparently determines which ground station is simulated.

14 Claims, 2 Drawing Sheets

U.S. PATENT DOCUMENTS

| | | | | |
|---|---|---|---|---|
| 6,968,390 | B1 * | 11/2005 | Chavez, Jr. | 709/238 |
| 7,010,302 | B1 * | 3/2006 | Nakajima et al. | 455/445 |
| 7,372,824 | B2 * | 5/2008 | Roberts et al. | 370/316 |

OTHER PUBLICATIONS

Richard et al, "Overview of In-Space Internet Node Testbed (ISINT)", NASA/TM-2000-209446, Aug. 2000.*

Kerczewski et al, "In-Space Internet-Based Communications for Space Science Platforms Using Commercial Satellite Networks", NASA-TM-1999-209456, Nov. 1999.*

Durkin et al, Fault Isolation Detection Expert (FIDEX) Part I: Expert System Diagnostics for a 30/20 Gigahertz Satellite Transponder (Final Report), The University of Akron, Mar. 31, 1992.*

Henderson, Thomas ("Networking over Next-Generation Satellite Systems", University of California at Berkeley, Fall 1999.*

Kirch, Olaf, "The Network Administrators' Guide" History, The Transmission Control Protocol, More On Ports, Outlook on the Following Chapters, Various Network Applications, The inetd Super-Server, The Services and Protocols Files, available Mar. 7, 1996 (obtained from http://tldp.org/LDP/nag/nag.htm).*

Bauer, Bodo, "SuSE Linux Guide for Geeks", Chapter 11, Dec. 2005.*

Landis et al, "Low Cost Satellite Ground Control Facility Design", IEEE AES Systems Magazine, Jun. 1993.*

Schmidt, Douglas, "A Family of Design Patterns for Flexibly Configuring Network Services in Distributed Systems", Proceedings of the Third International Conference on Configurable Distributed Systems, pp. 124-135, 1996.*

Wilkinson et al, "Design of a Satellite Tracking Station for Remote Operation and Multi-User Observation", 13th Annual Conference on Small Satellites, 1999.*

Control and Dynamics Simulation Facility at Hughes Space and Communications. Steve Zammit. Hughes Space and Communications Company. Aug. 1997.

Durst et al., "TCP Extensions for Space Communications" 1997 Wireless Networks, J.C. Baltzer AG, Science Publishers, p. 389-403.

Operating Missions as Nodes on the Internet (OMNI). Computer Science Corporation (CSC) Briefing. http://ipinspace.gsfc.nasa.gov/ Feb. 2000.

Priore, W., "A General Purpose Data Processing System Simulator for Satellite Ground Stations" ACM 1991 p. 269-288.

* cited by examiner

METHOD AND APPARATUS FOR SIMULATING MULTIPLE GROUND STATION RANGING FOR SPACECRAFT

RELATED APPLICATIONS

This application is a continuation patent application under 37 CFR § 1.53(b)(2) of prior U.S. application Ser. No. 09/645,896, filed Aug. 25, 2000, now abandoned. This application expressly claims the benefit of earlier filing date and right of priority from the prior application, and expressly incorporates the subject matter disclosed therein in its entirety by reference herein.

TECHNICAL FIELD

The present disclosure relates generally to spacecraft simulation, and more particularly, to a spacecraft simulation system that allows multiple ground station ranging.

BACKGROUND ART

The increasing complexity and cost of various spacecraft and associated launch and ground systems therefore have created a need for extensive detailed validation and verification before deployment along with rigorous training for support personnel from booster separation to satellite end of life. Examples of systems contributing to the need for extensive testing and training include: (i) multiprocessor-based systems which can have complex software architectures; (ii) multiple launch systems with various delivery characteristics and mission requirements; (iii) multiple ranging systems used to support mission and on-going operations; (iv) ground systems with multiple interacting elements; and (v) sophisticated ground software for automated spacecraft operations.

However, system-level ground testing to verify full system performance of a spacecraft and associated systems as well as a realistic training environment for support personnel can be costly and/or inadequate. Present implementations of hardware-in-the-loop systems to provide ground testing require special purpose interface hardware, software and harnessing to create a test environment whereby system hardware or emulations thereof can be integrated with high-fidelity, real-time simulations and then instrumented to facilitate testing and training.

As the spacecraft orbits the earth multiple ground stations are used to provide ranging vectors that provide real time information such as range, azimuth and elevation data of the spacecraft. As the satellite moves around the earth different ground stations and thus different ranging and tracking systems can monitor the spacecraft and generate ranging, azimuth and elevation data. The functions of the ranging and tracking systems are particularly important when the spacecraft is first launched into a transfer orbit and precise position data is required to efficiently and safely move the satellite from the transfer orbit into its final orbit. Then too, during normal operations, efficient station keeping is dependent upon the precise knowledge of spacecraft position. Turn-around ranging is typically used whereby two or more ground stations are used to improve the determination of spacecraft position. Thus, there is a need to simulate the operation of various ranging and antenna systems at various times to provide a complete simulation of the system. Prior efforts for simulating different ground stations include using different simulators for each of the ranging and antenna systems throughout the world that are to be used for a specific mission. However, such an approach is extremely costly due to the great number of simulators required. Also, systems that implement a separate machine to represent each ground station ranging mechanism require a complex exchange of ephemeris or ranging information with corresponding complexities related to time tagging of information. Inaccuracies of only a few milliseconds in these systems will result in invalid ranging results and comprise testing results. Another type of system modifies internal geographic references on a scheduled basis to match the ranging and tracking schedule in the ground control software. Sharing scheduling information creates considerable complexity and substantial modifications to the ground station software that then propagates to the simulation system. Limitations of the system may compromise the flexibility of the operational ground system design.

It would therefore be desirable to provide a single simulation system that allows multiple ground stations to be simulated accurately with respect to time.

SUMMARY

It is an object to provide a low cost, high fidelity system for time critical testing of a spacecraft and associated ground systems.

It is a further object to provide a simulation system that provides relative spacecraft data from multiple user-selectable ground sites.

In one aspect, a spacecraft emulation system for emulating the operation of a spacecraft and the operation of a plurality of ground stations is coupled to a spacecraft status and control system that requests a connection to one of the plurality of simulated ground stations. Range and tracking data is calculated for each of the plurality of simulated ground stations.

Ranging and tracking servers are instantiated by client(s) contained within the status and control system in order to retrieve specified ground station range and tracking data in accordance with instantiation parameters. The ranging and tracking servers then provide the requested range and tracking data to the status and control clients.

Further, the disclosure provides a method for simulating the operation of a spacecraft comprising the steps of:
  requesting a connection to one of a plurality of simulated ground stations;
  generating a range server name;
  in response to the range server name, generating server location parameters;
  calculating range data for each of the plurality of simulated ground stations; and,
    providing the range data for one of the plurality of simulated ground station's.

Embodiments of the present disclosure are advantageous in that the system may be used beyond a ranging and tracking application. That is, the simulation system may use one platform to simulate multiple systems in a less expensive and less complex manner.

These and other aspects and embodiments of the present disclosure will become better understood with regard to the following description, dependent claims and accompanying drawings.

BEST MODES

Figure 1:
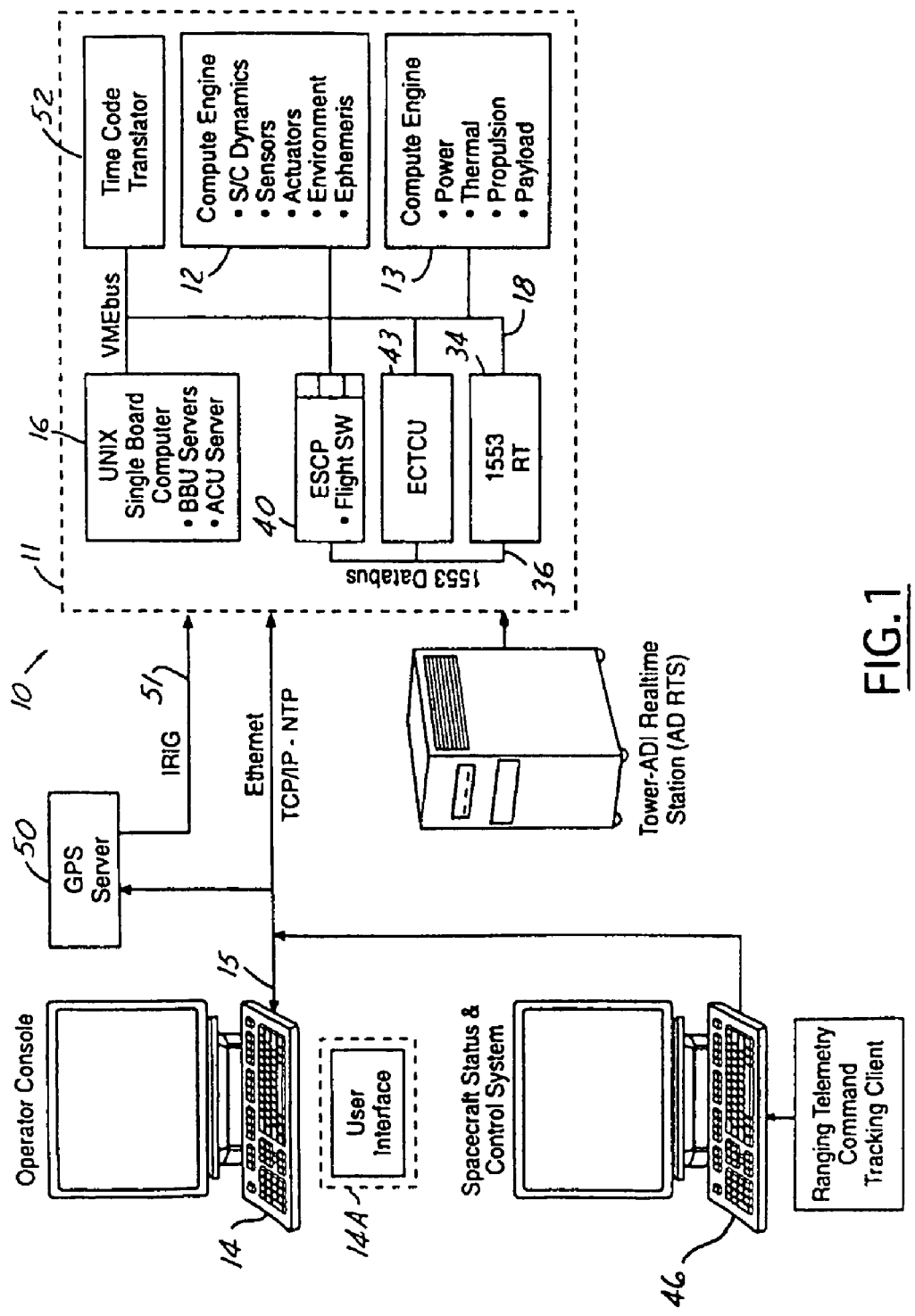
FIG. 1 is a block diagrammatic view of a preferred embodiment of a real-time spacecraft simulation system.

FIG. 1 is a block diagram of a real-time spacecraft simulation system 10. The real-time spacecraft simulation system 10 can be embodied by an Applied Dynamics Real Time Station (AD RTS) 11 manufactured by Applied Dynamics. The AD RTS 11 system is a stand-alone VMEbus-based real-time simulation and analysis system that uses a mixture of 9U×400 mm ADI or commercial off the shelf (COTS) processor and input/output cards. Physically, the AD RTS system can be contained in a mini-tower housing 11.

The real-time spacecraft simulation system 10 includes one or more simulation engines (SE) 12, 13 which are used to simulate system dynamics in real time. For an AD RTS system 11, the simulation engines 12, 13 are in the form of processor cards installed therein.

Each simulation engine 12, 13 is a single board computer (SBC) that solves dynamic equations of motion, power or heat transfer in real-time. One or more simulation engines can be installed in the real-time spacecraft simulation system as problem size and complexity increase throughput requirements. In the preferred embodiment, the first simulation engine 12 hosts the simulation software that allows it to be used to model the dynamics associated with the attitude control subsystem (ACS) of the spacecraft. The ACS simulation engine 12 models dynamics, sensors and actuators along with environmental and orbital conditions. The orbital simulation determines the spacecraft position and in addition, the range, altitude and azimuth relative to several ground station locations. In a constructed embodiment, the simulation engine 12, was implemented in a MVME2604 SBC operating at 330 MHz.

In the preferred embodiment, the simulation engine 13 hosts the simulation software that allows it to be used to model non-ACS spacecraft subsystems, such as power, thermal, propulsion, and payload (power and thermal characteristics). In a preferred embodiment, the simulation engine 13 is implemented in a MVME2604 SBC. However, the simulation engine may be embodied in a variety of other forms. The simulation modules 12, 13 are also preferably implemented in an ADI proprietary simulation language such as ADSIM.

A host computer 14 with an interface 14A is utilized for simulation development, cross-compiling, interfacing to a user, and displaying output information. The host computer 14 can be embodied by a computer workstation such as ones available from Sun, Hewlett-Packard, or VAX, for example. The host computer 14 runs simulation system software having interactive commands which provide simulation control and status. The simulation system software can be embodied by ADI SIMsystem software. Interface 14A provides the proper protocol to communicate with AD RTS 11.

The host computer 14 through interface 14A communicates with a VMEbus interactive manager (VIM) 16 through an Ethernet line or other communication line 15. The VIM 16 is operative to initialize and control the real-time spacecraft simulation system 10, download application software to the embedded processors in the real-time spacecraft simulation system 10, and monitor simulation parameters in real-time. The VIM 16 is also operative to provide servers that simulate the TCP/IP servers of the ground station baseband unit (BBU) and antenna control unit (ACU). The VIM 16 resident servers provide bi-directional data transfer between the processors in the real-time spacecraft simulation system 10 and the ground segment spacecraft status and control system clients (46) via an Ethernet 15 connection; spacecraft telemetry, ranging and tracking data in one direction and spacecraft or unit command data in the other direction. The VIM 16 also contains software that supports the SIM system operating system. In a preferred embodiment, VIM 16 was constructed of a Motorola MVME2604 SBC with a Unix based operating system.

The VIM 16 through the VMEbus 18 communicates telemetry and command data to the ECTCU 43 via the second simulation engine 13 which may contain interfacing software logic. The ECTCU 43 which is the 1553 databus bus controller, is a functional equivalent of the Central Telemetry and Command Unit (CTCU) bus controller element of the spacecraft. It contains non-flight versions of the CTCU flight components along with a customized version of the PROM sequencer firmware.

The ESCP 40 of the AD RTS system is a VMEbus-compatible card that emulates a Spacecraft Control Processor (SCP). The ESCP 40 includes a microprocessor along with supporting circuitry to execute flight software. The ESCP 40 and the simulation engines 12, 13 are accessed to perform data transfers, and to provide/receive data to/from the VIM 16 for real-time data logging and user control. A plurality of ESCPs can be included to reflect the redundancy of operational systems.

The 1553 RT card 34 is used to imitate the various MIL STD 1553 remote terminals (RI) used on a 1553 databus 36 that correspond to MIL STD 1553 RTs on the spacecraft. Specifically, the 1553 RT card 34 imitates the hardware interface of respective bus and payload Remote Telemetry and Command Units (RTCUs), as well as, the Hemispherical Inertial Reference Unit. The 1553 RT card 34 is preferably a commercial card from SBS. The software logic controlling the 1553 RT card 34 may physically reside in the second simulation engine 13 and may be implemented in C or COSIM, which is another proprietary language from ADI. The 1553 RT card 34 is preferably coupled to the 1553 databus 36, an ECTCU bus controller 43, and an ESCP 40.

The VMEbus 18 is utilized for time, command, telemetry, ranging, tracking, sensor, and actuator interfacing. Actuator data is communicated from the ESCP 40 to the simulation engine 12 via the VMEbus 18. Sensor data is communicated from the simulation engine 12 to the ESCP 40 via the VMEbus 18. Telemetry data is communicated from the ESCP 40 to the host computer 14 and/or ground segment spacecraft status and control system clients (46) via the VIM 16 and the VMEbus 18. Command data is communicated from the host computer 14 and/or ground segment spacecraft status and control system clients (46) to the ESCP 24 via the VMEbus 18 and the VIM 16. Ranging and tracking data is communicated from the simulation engine 12 to the host computer 14 and/or ground segment spacecraft status and control system clients (46) via the VIM 16 and the VMEbus 18.

Telemetry, ranging and tracking data transferred to the ground segment spacecraft status and control system clients (46) must be accurately time-tagged with a minimal amount of time domain drift and bias. To obtain a highly accurate time source, in order to control time domain drift and bias throughout the simulation system 10, a device such as a stratum one server 50 and a time code translator 52 may be used within system 11. The server 50 may be coupled to communication line 15. The stratum one server acquires Universal Time from the GPS satellite constellation and thereby provides a time reference via a network time protocol (NTP) or with an IRIG time code signal. In a preferred embodiment, the IRIG data is transferred to a time code translator 52 via a dedicated interface 51. The time code translator 52 then makes Universal Time data available to the VIM 16, and simulation engines 12, 13 via the VMEbus 18.

VIM 16, as mentioned above, is preferably a UNIX-based system that may be programmed to provide a variety of functions. As was discussed above, various satellite simulation data may be generated. The satellite simulation information as will be further described below may include various range and tracking data for ground stations supported by the system.

A ground segment spacecraft status and control system (46) containing multiple TCP/IP clients may also be coupled to system 11. The status and control system clients (46) request simulation data from various ground station servers by establishing data connections with ground station specific servers uniquely identified by IP address and port number. Ground station servers typically have common port numbers assigned to specific server types. For instance, a ranging server will have the same port number regardless of the ground station it is contained within. Nevertheless, ground segment spacecraft status and control systems typically allow for operator programming of both the IP address and port number although, typically the port number for a particular server type (e.g. telemetry, command, ranging, tracking) remains constant from ground station to ground station.

Figure 2:
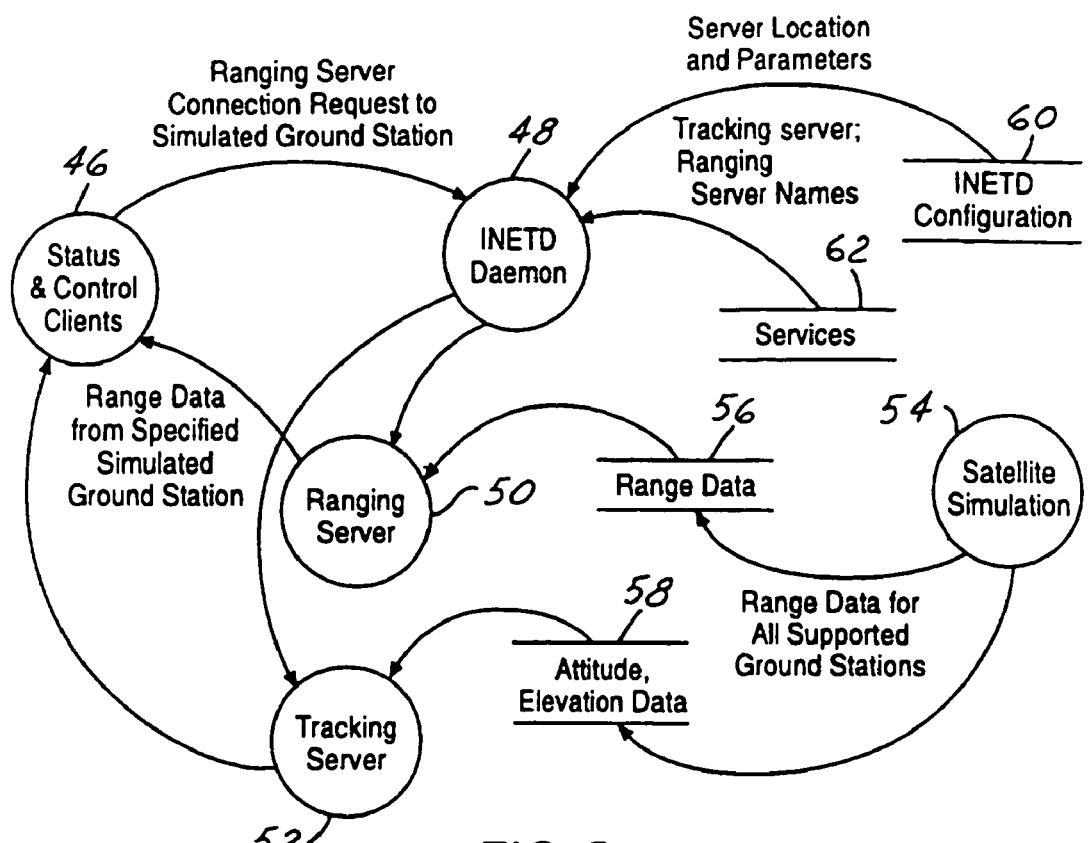
FIG. 2 is a data flow diagram of a real-time spacecraft simulation system in accordance with a preferred embodiment.

Referring now to FIG. 2, spacecraft status and control system clients 46 are illustrated coupled to system 11. System 11 includes an interface 48 coupled to a ranging server 50 and tracking server 52. Ranging server 50 and tracking server 52 are coupled to satellite simulation 54 which represents the data from satellite simulation engines 12 and 13. In addition, satellite simulation 54 may generate range data illustrated as 56 and tracking (attitude and elevation) data represented by 58. Interface 48 may also be coupled to INETD configuration store 60 and services store 62.

As mentioned above, the system 11 is preferably a UNIX-based computer system. Interface 48 is preferably a TCP/IP socket interface and INETD daemon process found in UNIX-based systems. The interface 48 receives a connection request from a spacecraft status and control client 46 identifying a specific port address for the particular ground station service (server) desired to be accessed. The spacecraft status and control clients utilize a common IP address but unique port address for a specific service. (Conversely, an operational system utilizes a unique IP address and common port address). That is, the system 11 identifies the different ground station information with different port numbers. Upon the request from the spacecraft status and control client 46, the ranging server name corresponding to the port address is received from the services store (file) 62. The interface 48 then uses the server name to retrieve the server application location and operating parameters from the INETD configuration store (file) 60. The INETD demon process then instantiates the server process and passes the operating parameters to it as illustrated in FIG. 2 whereby the interface 48 is coupled to ranging server 50 and tracking server 52. A data connection between the status and control client 47 and a specific server is therefore established as illustrated in FIG. 2 whereby the ranging server 50 is coupled to the status and control ranging client 46 and the tracking server is coupled to the status and control antenna control unit client. The Satellite Simulation 54 repeatedly updates the determination of the spacecraft range, attitude and elevation for a multiple of ground stations. By virtue of the operating parameters a specific instance of a ranging or tracking server obtains ranging or tracking data for a specific ground station and transfers the time-tagged data to the status and control client 46 as requested. In the preferred embodiment, both range data and antenna data are provided. However, the antenna control unit could be omitted from a system.

In operation, a connection to one of a plurality of ground stations is requested. The desired range server name is generated and in response to the range server name, the server location parameters are also obtained. Range data is continually calculated for each of the plurality of simulated ground stations supported by the system and the range server provides range data for the plurality of simulated ground stations. Likewise, the desired tracking server name is generated and in response to the tracking server name, the server location parameters are also obtained. Tracking data (spacecraft elevation and azimuth) is continually calculated for each of the plurality of simulated ground stations supported by the system and the tracking server provides azimuth and elevation data for the plurality of simulated ground stations.

While the best modes have been described in detail, those familiar with the art to which this disclosure relates will recognize various alternative designs and embodiments which are intended to be within the scope of the following claims.

What is claimed is:

1. A method of simulating ranging data of a simulated spacecraft from one of a simulated ground station selected from a plurality of simulated ground stations associated with a satellite orbit simulation comprising the steps of:
   requesting a connection to a desired range server utilizing a common IP address for one of a plurality of simulated ground stations by identifying a unique port address for the desired range server;
   generating a range server name corresponding to the unique port address;
   in response to the range server name, generating location parameters for the desired range server;
   instantiating the desired range server dedicated to the one of the simulated ground stations;
   calculating simulated range data for the one of the simulated ground stations; and,
   providing the simulated range data for the one of the simulated ground stations to a spacecraft status and control client corresponding to the unique port address in response to the unique port address.

2. A method as recited in claim 1 wherein the connection to the desired range server is requested from the spacecraft status and control client.

3. A method as recited in claim 2, wherein the spacecraft status and control client utilizes the common IP address for the plurality of simulated ground stations while providing the unique port address.

4. A method as recited in claim 1, wherein the step of requesting comprises simultaneously requesting connections to desired range servers in multiple ground stations, wherein each of the ground stations has a common IP address and each of the desired range servers has a unique port address.

5. A method as recited in claim 4 wherein the range server name is generated in response to the unique port address and is used to instantiate the range server specific to each of the ground stations.

6. A method as recited in claim 1 further comprising the step of providing tracking information for the one of the simulated ground stations.

7. A method of simulating the operation of a simulated spacecraft associated with a satellite orbit simulation comprising the steps of:
   generating range, attitude and elevation data for a plurality of simulated ground stations;
   identifying a desired simulated ground station from the plurality of simulated ground stations utilizing a common IP address, said desired simulated ground stations being associated with a unique port address; and, providing the simulated range data generated for the desired simulated ground station to a real time client in response to the unique port address.

8. A method as recited in claim 7 wherein the step of identifying comprises a step of generating a simulated range server name and generating a tracking server name.

9. A method as recited in claim 8 wherein the step of identifying further comprises in response to the step of generating a range server name and tracking server name, generating server location parameters.

10. A method as recited in claim 7 further comprising a step of generating a connection to one of the plurality of simulated ground stations.

11. A method as recited in claim 7 wherein the real time client requests a connection to the desired simulated ground station by identifying the unique port address.

12. A method as recited in claim 8 wherein the step of generating a simulated range server name comprises generating the range server name in response to the unique port address and wherein the step of generating a tracking server name comprises generating the tracking server name in response to the unique port address.

13. A spacecraft emulation system for a simulated spacecraft comprising:
   a spacecraft status and control client;
   an interface coupled to the spacecraft status and control client for generating identification information for a desired simulated ground station;
   a tracking data server;
   a range data generator for generating simulated range data for a plurality of simulated ground stations; and,
   a range server coupled to the range data generator and spacecraft status and control unit, said range server having the simulated range data for said plurality of simulated ground stations therein and said range server providing the simulated range data to said spacecraft status and control client;
   wherein said interface, range data generator, range server and tracking data server are coupled within a single unit.

14. A spacecraft emulation system as recited in claim 13 further comprising wherein said tracking data server is coupled with the spacecraft status and control client, the tracking data server providing elevation and azimuth data to said spacecraft status and control client.

* * * * *